United States Patent [19]

Newby

[11] Patent Number: 4,518,400

[45] Date of Patent: May 21, 1985

[54] STEAM-SIEVE METHOD AND APPARATUS

[76] Inventor: Gerald R. Newby, R.D. 2, Belden Hill, Harpursville, N.Y. 13787

[21] Appl. No.: 568,622

[22] Filed: Jan. 6, 1984

[51] Int. Cl.³ .............................................. B01D 53/04
[52] U.S. Cl. .......................................... 55/68; 55/75; 55/389
[58] Field of Search ................. 55/16, 17, 68, 75, 158, 55/389

[56] References Cited

U.S. PATENT DOCUMENTS

| 2,494,554 | 1/1950 | Harlow | 55/16 X |
|---|---|---|---|
| 2,497,898 | 2/1950 | McGurl | 55/16 X |
| 2,637,625 | 5/1953 | Garbo | 55/16 X |
| 3,011,589 | 12/1961 | Meyer | 55/68 X |
| 3,142,547 | 7/1964 | Marsh et al. | 55/26 |
| 3,221,476 | 12/1965 | Meyer | 55/28 |
| 3,252,268 | 5/1966 | Stark | 55/25 |
| 3,338,030 | 8/1967 | Feldbauer, Jr. | 55/25 |
| 3,699,218 | 10/1972 | Smith et al. | 55/68 X |
| 3,838,553 | 10/1974 | Doherty | 55/68 X |
| 3,881,891 | 5/1975 | Goltsov et al. | 55/16 |
| 3,901,668 | 8/1975 | Seitzer | 55/16 |
| 3,901,669 | 8/1975 | Seitzer | 55/16 |
| 4,032,306 | 6/1977 | Lee | 55/17 |
| 4,297,191 | 10/1981 | Chen | 55/17 X |

Primary Examiner—Robert Spitzer
Attorney, Agent, or Firm—Richard G. Stephens

[57] ABSTRACT

Steam is compressed and heated to make a churn gas that is rife in synthetic fuel, and hydrogen and oxygen are sifted from the churn gas before the steam is recycled.

9 Claims, 1 Drawing Figure

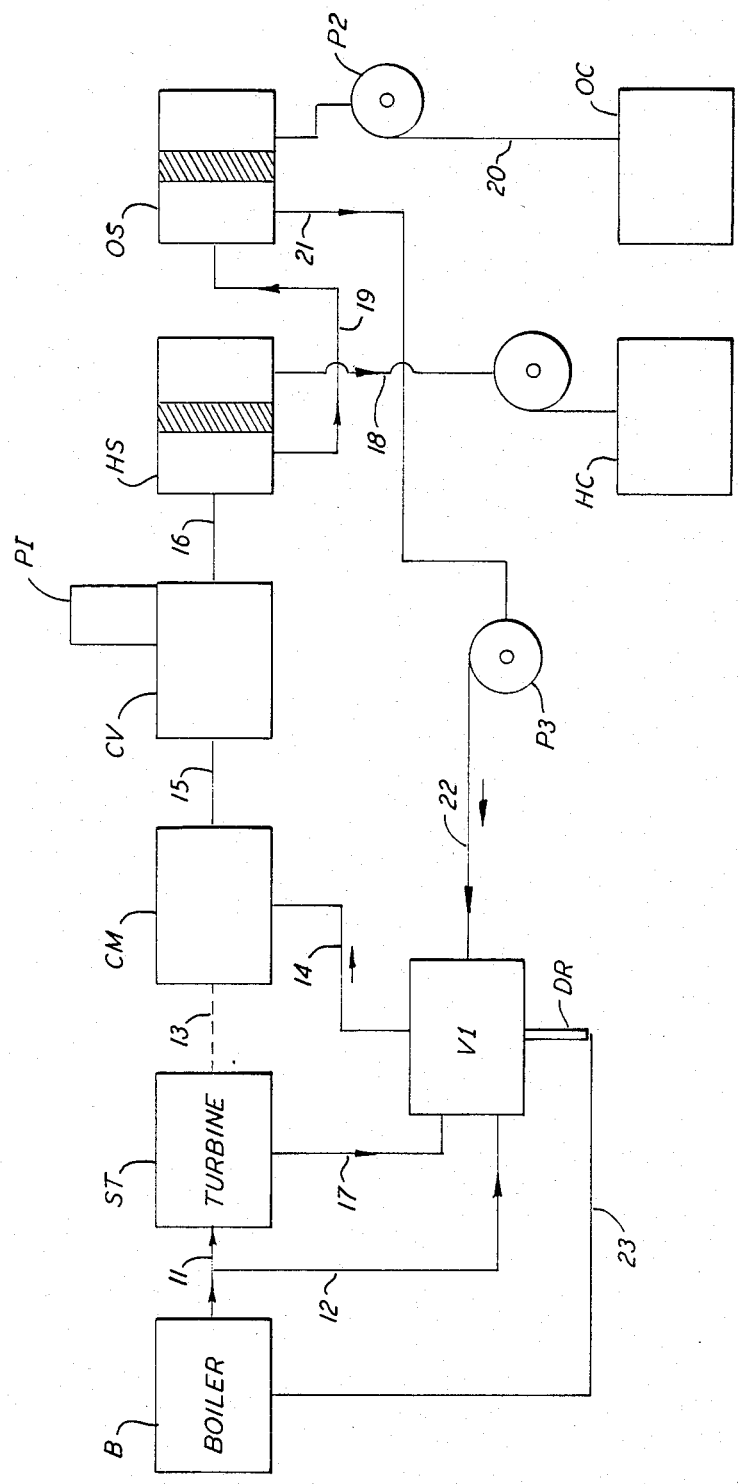

STEAM-SIEVE METHOD AND APPARATUS

The invention relates to production of hydrogen and oxygen from steam by effusion of components of steam which have been dissociated by means of temperature and pressure, through one or more microporous membranes. For convenience of explanation, the apparatus of the present invention will be referred to herein as a steam-sieve system.

The production of large quantities of hydrogen for use as a synthetic fuel by thermal dissociation of water has been rejected as impractical by the prior art for three reasons, all stemming from the fact that the temperature required to produce a large dissociation fraction is very high, on the order of 3000K. Heat sources at a temperature of that order are largely unavailable, and construction of crucibles which will withstand such temperatures poses serious difficulties.

Prior art of interest includes the article "Hydrogen Energy" by J. O'M. Bockris in Encyclopedia of Chemical Technology (Wiley, New York, 1980); E. Bilgen and J. Galindo, Int. J. Hydrogen Energy, Vol. 6, page 139 (1981); "On the feasibility of direct dissociation of water using solar energy" in Hydrogen Energy Fundamentals, T. N. Vezirozlu ed, Plenum Press, New York, 1976; Int. J. Hydrogen Energy Vol. 2, page 251, 1977, "On the methods for large scale hydrogen production from water", page 371 Hydrogen Energy, Plenum Press, New York, 1975.

At any given conditions of temperature and pressure, a chemical equilibrium will be established between the competing processes of dissociation and recombination, leading to a certain steady-state set of concentrations or partial pressures of the dissociation products. The appropriate reaction to consider is

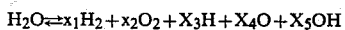

$$H_2O \rightleftharpoons x_1H_2 + x_2O_2 + x_3H + x_4O + x_5OH$$

Analysis of this equilibrium performed by Bilgen et al shows that extremely high temperatures are required to produce significant dissociated fractions. Furthermore, LeChatelier's principle demands that as pressure is increased, the equilibrium will be driven toward recombination, so that at high pressures the dissociated fraction will be miniscule even for very high temperatures. On the other hand, it is the partial pressure of hydrogen, not dissociated fraction, which results in transport across the hydrogen sieve used in the invention. If one studies the reaction from the point of view of partial pressure rather than dissociated fraction, it turns out that the dissociated fraction declines less rapidly than the pressure increases, and hence substantial partial pressures of dissociation products exist under conditions of elevated temperature and pressure.

It generally has been believed in the prior art that the effective dissociation required for practical synthetic fuel production could not be achieved unless the temperature of steam exceeded 3000° C., an impractically high temperature, and generally believed that pressure of the steam had no appreciable effect of dissociation. In accordance with the invention, effective dissociation is achieved by use of temperatures of the order of 1726°-2226° C., which are low enough that structures can withstand them, together with pressures of the order of 5000 psi, which are also low enough that structures used can withstand them.

In accordance with the invention, steam at an ordinary process temperature and an ordinary process pressure is supplied to compressor means and heated by adiabatic compression. The high pressure, high temperature steam then is fed to a first separation chamber divided by a first effusion membrane or molecular sieve, which separates the free hydrogen which has been dissociated by the high temperature and pressure. The separated hydrogen is cooled and liquified. The oxygen-enriched gas from the upstream side of the first sieve or effusion membrane is fed to a second separation chamber divided by a second molecular sieve or effusion membrane, which separates free oxygen, which is cooled and liquified. The gases remaining on the upstream side of the second effusion membrane are recycled to be mixed with the steam fed to the compressor means.

The gas on the upstream side of the first effusion membrane is a mixture of $H_2$, $O_2$ and $H_2O$ in stoichiometric quantities, the mole fraction x of $H_2$ being determined by temperature and pressure on that side of that membrane. In steady-state the reaction producing separation may be stated as:

$$H_2O \rightarrow xH_2 + x\frac{1}{2}O_2 + (1-x)H_2O \qquad (1)$$

Since the relatively light $H_2$ molecule diffuses more readily through the first effusion membrane than do the other two gases, the gas mixture downstream of that membrane is enriched in $H_2$ above the stoichiometric fraction. Conversely, the gas mixture upstream of that membrane, being depleted of $H_2$, is rich in $O_2$. If $R_H$ is the relative diffusion rate of $H_2$, $R_o$ is that of $O_2$, and $R_w$ is that of $H_2O$, then the reaction described by equation (1) continues in two branches. The reaction for the downstream or $H_2$ branch is given by:

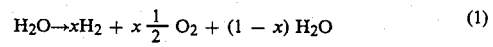

$$H_2 \rightarrow R_H x H_2 + R_o \frac{x}{2} O_2 + R_w(1-x)H_2O \qquad (2)$$

and that for the upstream or $O_2$ branch is given by:

$$O_2 \rightarrow (1-R_H)xH_2 + (1-R_o)\frac{x}{2}O_2 + (1-R_w)(1-x)H_2O \qquad (3)$$

Relative diffusion rates are given by Graham's Law, which states that $$\frac{R_1}{R_2} = \sqrt{\frac{m_2}{m_1}}$$

where $m_2$ and $m_1$ are molecular weights of gases having relative diffusion rates of $R_2$ and $R_1$, respectively. With $H_2$, $O_2$ and $H_2O$ having molecular weights of 2, 32 and 18, respectively, their diffusion rates are in the ratios 12:3:4, or

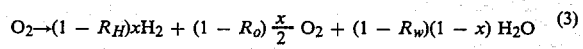

$$R_H = \frac{12}{19} \qquad R_o = \frac{3}{19} \qquad R_w = \frac{4}{19} \qquad (4)$$

which one may substitute into equations (2) and (3) to give:

$$H_2 \rightarrow \frac{12}{19} xH_2 + \frac{3}{19} \frac{x}{2} O_2 + \frac{4}{19} (1-x) H_2O \qquad (5)$$

$$O_2 \rightarrow \frac{7}{19} xH_2 + \frac{16}{19} \frac{x}{2} O_2 \frac{15}{19} (1-x) H_2O \qquad (6)$$

On the downstream side of the first effusion membrane, any oxygen not separated out will recombine as the temperature falls as condensation occurs, reducing the total concentration of $H_2$, so that the reaction in the hydrogen condenser downstream from the first effusion membrane will become:

$$H_2 \rightarrow \frac{9}{19} xH_2 + \frac{3}{19} xH_2O + \frac{4}{19} (1-x) H_2O \qquad (7)$$

Similarly, on the downstream side of the second effusion membrane any free $H_2$ will recombine as condensation occurs, reducing the $O_2$ concentration, so that the reaction in the condenser downstream from the second effusion membrane will be:

$$O_2 \rightarrow \frac{9}{19} \frac{x}{2} O_2 + \frac{7}{19} xH_2O + \frac{15}{19} (1-x) H_2O \qquad (8)$$

Simplifying, the overall reaction may be described by:

$$H_2O \begin{cases} H_2 \longrightarrow \frac{9}{19} \times H_2 + \left(\frac{4}{19} - \frac{x}{19}\right) H_2O \\ O_2 \longrightarrow \frac{9}{19} \frac{x}{2} O_2 + \left(\frac{15}{19} - \frac{8x}{19}\right) H_2O \end{cases} \qquad (9)$$

The production yield for hydrogen thus is 9/19 of the dissociation fraction of hydrogen, and the yield for oxygen is half of the hydrogen yield. Assuming a process at 2000 K. and 200 at m(1730° C. and 2940 psi), the dissociation fraction for hydrogen is $x = 7.74 \times 10^{-4}$ moles/mole, so that from equation (9) one finds that for every mole of steam run through the system, $3.67 \times 10^{-4}$ moles of $H_2$ can be recovered, and $1.83 \times 10^{-4}$ moles of $O_2$ can be recovered. In terms of weights, for every million pounds of steam run through, 40.737 pounds of hydrogen and 325.895 pounds of oxygen can be recovered.

Table I shows yield amounts over a range of temperatures and pressures, in terms of pounds of gases recovered per million pounds of steam processed.

TABLE I

Production yields in pounds per million of steam. For each entry, the top figure is for hydrogen, the bottom for oxygen.

| T (K) | Pressure (atm) | | | | |
|---|---|---|---|---|---|
|  | 0.1 | 1 | 10 | 100 | 200 | 400 |
| 1000 | 0.0298 | 0.0138 | 0.00642 | 0.003 | 0.00237 | 0.00188 |
|  | 0.239 | 0.111 | 0.0514 | 0.02 | 0.0189 | 0.0150 |
| 2000 | 508 | 237 | 111 | 51.3 | 40.7 | 32.3 |
|  | 4070 | 1900 | 884 | 411 | 326 | 259 |
| 2500 | 3370 | 1630 | 768.4 | 358.4 | 285.3 | 226 |
|  | 27000 | 13000 | 6150 | 2870 | 2280 | 1810 |
| 3000 | 19500 | 5470 | 2710 | 1290 | 1030 | 821 |
|  | 156000 | 43800 | 21600 | 10400 | 8250 | 6570 |
| 3500 | 19500 | 11800 | 6320 | 3150 | 2530 | 2030 |
|  | 156000 | 94700 | 50500 | 25200 | 20300 | 16300 |
| 4000 | 112000 | 18800 | 11200 | 5950 | 4840 | 3920 |
|  | 893000 | 150000 | 89700 | 47600 | 68700 | 31400 |

One may note that production yields vary directly with temperature, and inversely with pressure, but it should be noted that production rates will actually increase with pressure, because partial pressures of the components rise with total pressure faster than the dissociation fractions fall.

Thus a primary object of the invention is to provide improved method and apparatus for producing synthetic fuel. A more specific object of the invention is to provide synthetic fuel by compressing and heating steam to provide a multi-component gas mixture from which hydrogen and oxygen can be readily separated or sifted. Another object of the invention is to provide method and apparatus which can produce hydrogen useful as a synthetic fuel with improved economic efficiency.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which the single FIGURE is a schematic diagram illustrating an exemplary embodiment of the invention.

Referring to the FIGURE, steam supplied at ordinary process temperature and pressure by means such as boiler B is applied via line 11 to a conventional steam turbine ST to drive the same, and applied via line 12 to a mixing vessel V1. The pressure and temperature of the steam supplied by boiler B are by no means critical. In typical operation of the invention they might be 500 psi and 600° F., by way of example. The steam turbine mechanically drives compressor means CM, as diagrammatically indicated by dashed line 13. Exhaust steam from turbine T is conveyed to mixing vessel V1 via line 17.

The compressor means CM receives steam from vessel V1 via line 14, compresses the same, and delivers high-temperature high-pressure steam via line 15 to vessel CV, which is sometimes referred to hereinafter as the churn vessel or churn tank. The compressor means CM will ordinarily comprise a battery of successive compressor stages capable of compressing the steam to a very high pressure, of the order of 5000 psi, for example. The work done in compressing the steam (from a pressure of say 500 psi to a pressure of say 5000 psi) also raises the temperature of the steam, to a value preferably within the range 1726°–2226° C.(3139°–4039° F.). It is necessary, of course, that line 15 and churn vessel CV be capable of withstanding the mentioned high pressure and temperature, and to decrease loss of heat both of those elements are heavily insulated, preferably with refractory insulation. In ordinary operation of the invention, the temperature will not appreciably exceed 2300° C., and the pressure need not exceed 6000 psi. Tanks and lines, and sieves can be readily constructed to withstand these temperatures and pressures. The insulation system in the churn tank will add to the resulting increase in temperature within the gas at the churn caused by the increase of internal energy in the gas by compression which is delivered by the compressor means. The insulation in the churn tank will also help to protect the steel material from which the churn tank is made from the elevated temperatures. In the FIGURE an optional photon irradiator PI is shown associated with churn tank CV to subject the compressed steam or gas mixture within that tank to photons, thereby to promote dissociation by photolysis and to maintain the temperature of the mixture above 1726° C.(3139° F.). Photon irradiator PI may comprise, for example a high-powered electrically-powered light and heat source. Photolysis adds to hydrogen separation without added temperature. Photon irradiator PI may comprise any of a variety of photon generation devices which produce photons in sufficient intensity at a given wavelength to effectively increase dissociation, and these may include, for example, radio frequency transmitters, heat lamps, electric arcs, lasers, and other devices. A wavelength within the range of 1800-1950 Angstroms is believed to be most effective, but other wavelengths may be used with greater intensities.

The gas mixture is conveyed from churn tank CV via line 16 to a first sieve vessel HS. An additional photon irradiator (not shown) also may be associated with the input chamber of vessel HS. Sieve vessel HS contains a microporous membrane or sieve element through which hydrogen molecules can pass, but through which oxygen and water molecules cannot pass. For example, the molecular sieve may comprise a 5 Angstrom sieve. In the FIGURE, the sieve is diagrammatically indicated by cross-hatching, and the sieve will be seen to divide vessel HS into two chambers on opposite sides of the sieve. The present invention contemplates that the pressure on the upstream side of the membrane may vary over a wide range and the pressure on the other side of the membrane will be somewhat lower, and will be negative in some applications of the invention.

The hydrogen separated out by sieve means HS is conveyed from the second chamber of vessel HS via pump P1, which is preferably driven by an electric motor not shown, and via line 18 to conventional hydrogen cooling and liquifying means HC, which can draw hydrogen through line 18 at the rate required to maintain the desired pressure on the downstream side of the hydrogen sieve.

The oxygen-enriched mixture which does not pass through the hydrogen sieve is conveyed from the first chamber of vessel HS via line 19 to a second sieve vessel OS. Sieve vessel OS contains a molecular sieve (indicated by cross-hatching) which is operable to pass oxygen but to block passage of steam, and which divides vessel OS into first and second chambers. The oxygen separated out by sieve means OS is conveyed from the second chamber of vessel OS via pump P2 and line 20 to conventional oxygen cooling and liquifying means OC. Pump P2 is also preferably driven by an electric motor not shown. The mixture which does not pass through the oxygen sieve is conveyed from the first chamber of vessel OS via pump P3 and lines 21 and 22, back to mixing vessel V1. A venting means or drain DR including a valve (not shown) vents sufficient steam to maintain steady flow through the system. The steam from drain DR is conveyed back to the input system of boiler B1 via line 23, though some of the steam may be used for other purposes, if desired. Any of pumps P1, P2, and P3 may be driven by steam, if desired, rather than by electrical motors.

The invention comtemplates conversion of steam, as a crude or feedstock, into a churn gas that is rife in synthetic fuel, using temperature and pressure to make the churn gas. Then by pouring the churn gas into the elemental or molecular sieves, the synthetic fuel hydrogen is sifted from the churn gas, and as a by-product, the oxidizer, oxygen, is sifted for by sieves, from the oxygen-rich steam gas before the steam is re-cycled.

The churn system within a steam-sieve system works by creating a mixed gas from steam, by compressing the steam gas by a compressor means to create a condition of pressure and increased temperature in the churn gas. One of the important achievements of the present invention is the economic efficiency that can be obtained in the manufacture of the synthetic fuel, hydrogen. Calculations indicate that with a typical system operating in accordance with the invention, wherein approximately 24000 horsepower equivalent of process steam is supplied from the boiler to the turbine, and wherein approximately 5.3 million pounds per hour of multi-component gas mixture is compressed, heated and circulated, which requires approximately 15,300 HP of electricity, approximately 2120 pounds per hour of hydrogen will be obtained, or approximately 0.0542 pounds of hydrogen per horsepower-hour. These above calculations conservatively utilize a sifting efficiency of 75%, while in fact, hydrogen sifting efficiencies of the order of 90% can be readily achieved, as is shown by U.S. Pat. Nos. 3,142,547; 3,221,476; 3,252,268 and 3,338,030.

The churn system part in a system according to the invention is a new way to utilize steam, that is compressed by a compressor machine to elevated pressure and temperature, contained within an insulated churn tank, and regulated with temperature and photons, by photon generation apparatus, to ready a gas, steam, into a new gas, churn gas, that is rife in synthetic fuel, hydrogen, ready to be poured into element sieves, that sift for synthetic fuel, hydrogen and oxidizer, oxygen.

While the invention has been described in connection with apparatus which produces oxygen as well as hydrogen, it is important to note that the second sifting for oxygen may be eliminated in some applications of the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of producing hydrogen which comprises the steps of: compressing steam to provide a multi-component gas mixture; and applying the multi-component gas mixture to a first molecular sieve through which hydrogen may pass, but through which oxygen and steam will not pass.

2. The method of claim 1 wherein the steam is compressed to a pressure exceeding 4000 psi and to a temperature exceeding 1500° C.

3. The method of claim 1 which includes the step of applying the mixture which does not pass through said first molecular sieve to a second molecular sieve through which oxygen will pass, but through which steam will not pass.

4. The method of claim 1 which includes the step of re-compressing and re-applying at least a portion of the mixture which does not pass through said first molecular sieve.

5. The method of claim 1 which includes the steps of irradiating the compresses mixture with photons prior to application of the compressed mixture to said first molecular sieve.

6. Apparatus for producing hydrogen, comprising, in combination: compressor means for compressing steam to a pressure exceeding 4000 psi and a temperature exceeding 1500° C.; a first vessel; means for passing compressed steam from said compressor means to said first vessel to provide a multi-component gas mixture; a second vessel containing a molecular sieve and having first and second chambers on opposite sides of said molecular sieve, said molecular sieve being operable to pass hydrogen and block passage of oxygen and steam; means for passing said mixture from said first vessel to the first chamber of said second vessel; and means for removing hydrogen from said second chamber of said second vessel.

7. Apparatus according to claim 6 having a third vessel containing a molecular sieve and first and second chambers on opposite sides of its molecular sieve, said molecular sieve of said third vessel being operable to pass oxygen and to block passage of steam; means for passing mixture from said first chamber of said second vessel to said first chamber of said third vessel; and means for removing oxygen from said second chamber of said third vessel.

8. Apparatus according to claim 7 having means for passing mixture from said first chamber of said third vessel to said compressor means.

9. Apparatus according to claim 6 wherein said compressor means comprises a steam-driven turbine mechanically connected to drive a compressor.

* * * * *